United States Patent [19]

Dubuisson et al.

[11] Patent Number: 4,630,293

[45] Date of Patent: Dec. 16, 1986

[54] MILEAGE TOTALIZER WITH NON VOLATILE MEMORY

[75] Inventors: Georges Dubuisson, Orgeval; Tan Duc Huynh, Noisiel, both of France

[73] Assignee: e.d. Veglia, Paris Cédex, France

[21] Appl. No.: 643,825

[22] Filed: Aug. 24, 1984

[30] Foreign Application Priority Data

Aug. 24, 1983 [FR] France ................................ 83 13646

[51] Int. Cl.⁴ .............................................. G01B 7/00
[52] U.S. Cl. ........................................ 377/24; 377/49
[58] Field of Search .................. 377/24; 364/561, 424; 324/166

[56] References Cited

U.S. PATENT DOCUMENTS

| 4,031,363 | 6/1977 | Freeman et al. | 377/24 |
| 4,409,663 | 10/1983 | Becker et al. | 364/561 |
| 4,539,641 | 9/1985 | Kawashimo et al. | 364/561 |

FOREIGN PATENT DOCUMENTS

| 0067925 | 12/1982 | European Pat. Off. | |
| 16307A | 1/1982 | Japan | 364/561 |
| 129213A | 8/1983 | Japan | 364/561 |

OTHER PUBLICATIONS

Patents Abstracts of Japan, vol. 6, No. 79, 18 mai 1982 (P-115), (957), & JP-A 57 16307 (Nissan) 27 Janvier 1982.

Primary Examiner—John S. Heyman
Assistant Examiner—K. Ohralik
Attorney, Agent, or Firm—Stevens, Davis, Miller & Mosher

[57] ABSTRACT

A microprocessor transfers into a first so-called "fixed" zone of the memory the intermediate total distance travelled since the vehicle was put on the road and, in a second so called "journey" zone of the memory the successive partial distances travelled between each power supply cut off, the successive partial distances being transferred into the cells of the journey zone of the memory each time the power is switched off.

4 Claims, 4 Drawing Figures

| | | | | |
|---|---|---|---|---|
| 1 | 0 | 0 | 0 | 1 |
| 2 | 0 | 0 | 0 | 0 |
| 3 | 0 | 0 | 0 | 0 |
| 4 | 0 | 0 | 0 | 1 |
| 5 | 0 | 0 | 1 | 0 |
| 6 | 0 | 0 | 1 | 1 |
| 7 | 0 | 1 | 1 | 0 |
| 8 | 1 | 1 | 1 | 1 |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| ⋮ | | | | |
| 62 | | | | |
| 63 | | | | |
| 64 | | | | |

FIG.2A

| | |
|---|---|
| 1 | 1 |
| 2 | 0 |
| 3 | 0 |
| 4 | 1 |
| 5 | 2 |
| 6 | 3 |
| 7 | 6 |
| 8 | F |
| 9 | |
| 10 | |
| 11 | |
| 12 | |
| 13 | |
| 14 | |
| 15 | |
| 16 | |
| 17 | |
| ⋮ | |
| 62 | |
| 63 | |
| 64 | |

FIG.2B

| $D_{I_4}$ | $D_{I_3}$ | $D_{I_2}$ | $D_{I_1}$ | F | $D'_{P_4}$ | $D'_{P_3}$ | $D'_{P_2}$ | $D'_{P_1}$ |
|---|---|---|---|---|---|---|---|---|
| E | $D''_{P_4}$ | $D''_{P_3}$ | $D''_{P_2}$ | $D''_{P_1}$ | E | $D'''_{P_3}$ | $D'''_{P_2}$ | $D'''_{P_1}$ |
| E | D | 0 | 0 | 0 | 0 | 0 | | |
| 0 | 0 | | | | | | | |
| | | | | | | | | |
| | | | | | | | | |
| | | | | | | | | |
| | | | | | | $D_{I_7}$ | $D_{I_6}$ | $D_{I_5}$ |

FIG.3

MILEAGE TOTALIZER WITH NON VOLATILE MEMORY

BACKGROUND OF THE INVENTION

The present invention relates to an electric mileage totalizer in which a digital means, such as a counter, associated with a sequencer or micro processor, counts the pulses coming from a wheel sensor, translates them and transmits them to a display unit which displays, on the one hand, the total distance travelled since the vehicle was put on the road and, on the other hand, the partial distance travelled since the last reset, this distance information being transferred, in order to safeguard it, into a non volatile memory, each time the supply voltage is switched off.

Non volatile memories offer wide possibilities from the electronic point of view, because of their relatively low cost price and ease of wiring. But they come up against certain problems in use, due more especially to the conditions in which the information is transferred from the counter to the memory and to the limited life span of these memories.

In so far as the transfer of information is concerned, the problem resides in the fact that the counter, which is an integrated logic circuit, for example a micro processor, with a supply voltage threshold, may, whenever it is switched on or switched off, or more precisely at each threshold cross over, generate random signals controlling the memory and possibly causing loss of its contents.

In so far as the life span of the memory is concerned, it depends on the number of possible writing cycles, i.e. on the number of information transfers into the cells of the registers of the memory. At the present time the maximum number is 1000, that is to say that after a 1000 times, writing changes in the cells are no longer guaranteed.

Now, this limitation is very serious for a motor vehicle mileage meter.

In fact, at the rate of ten ignition switch off operations per day for a vehicle used 20 days per month and 11 months in the year, that is to say 2 200 writing cycles per year, a non volatile memory with a maximum number of 1000 cycles would have a life span of six months.

If we assume that the life of a vehicle is 14 years, the writing rate should be reduced by 28 times at least.

SUMMARY OF THE INVENTION

The present invention solves the problems which have just been outlined. For this, there are mounted, between the microprocessor and the switch for the battery of the car, a first voltage comparator and a very high capacity capacitor serving as energy reservoir which are associated with a voltage regulator, so that any voltage drop is made known to the comparator which informs the counter thereof, the energy stored in the capacitor maintaining the voltage at a sufficient value for a certain time so as to allow transfer, or safeguarding, of the information from the microprocessor to the memory.

The invention further provides the possibility of directly supplying the capacitor and the above regulator from the battery, by direct control by the counter of logic control switch so as to ensure a sufficient power supply for transferring the information into the memory on ignition switch off.

The invention further provides, so as to protect the non volatile memory, from initialization of the microprocessor when the supply voltage drops below a certain threshold. For this, a second comparator compares the voltage from the regulator with a reference voltage in order, should the voltage drop below the reference value, the compel the counter to keep a given state at its outputs, generally zero.

So as to reduce the rate of writing in the memory, the invention provides for writing in a first so called "fixed" zone of the memory successive intermediate total distances covered since the vehicle was put on the road, i.e. relatively large distances whose value changes little and, in successive adjacent cells of a second so called "journey" zone of this memory, the relatively small successive partial distances travelled between each switch off of the supply current.

At each ignition switch off, the microprocessor transfers the new partial distance into the cells of the journey zone of the memory.

At each switch on, the intermediate total and partial distances are transferred into the microprocessor which adds them to provide a total distance traveled.

The fact of writing partial distances much smaller than the total distances and causing them to flow in a particular zone of the memory considerably reduces the rate of writing in the memory and thus achieves in a manner of speaking a "compression" of the stored data.

BRIEF DESCRIPTION OF THE DRAWINGS

With the essential features of the invention outlined above, an embodiment and implementation of the invention will now be described by way of example with reference to the accompanying drawings in which:

FIG. 2a is a diagram of a non volatile memory structure,

FIG. 2b is a linear representation of this structure, and

FIG. 3 is a diagram of a particular case of organization of the memory.

DESCRIPTION OF THE PREFERRED EMBODIMENT

Figure 1:
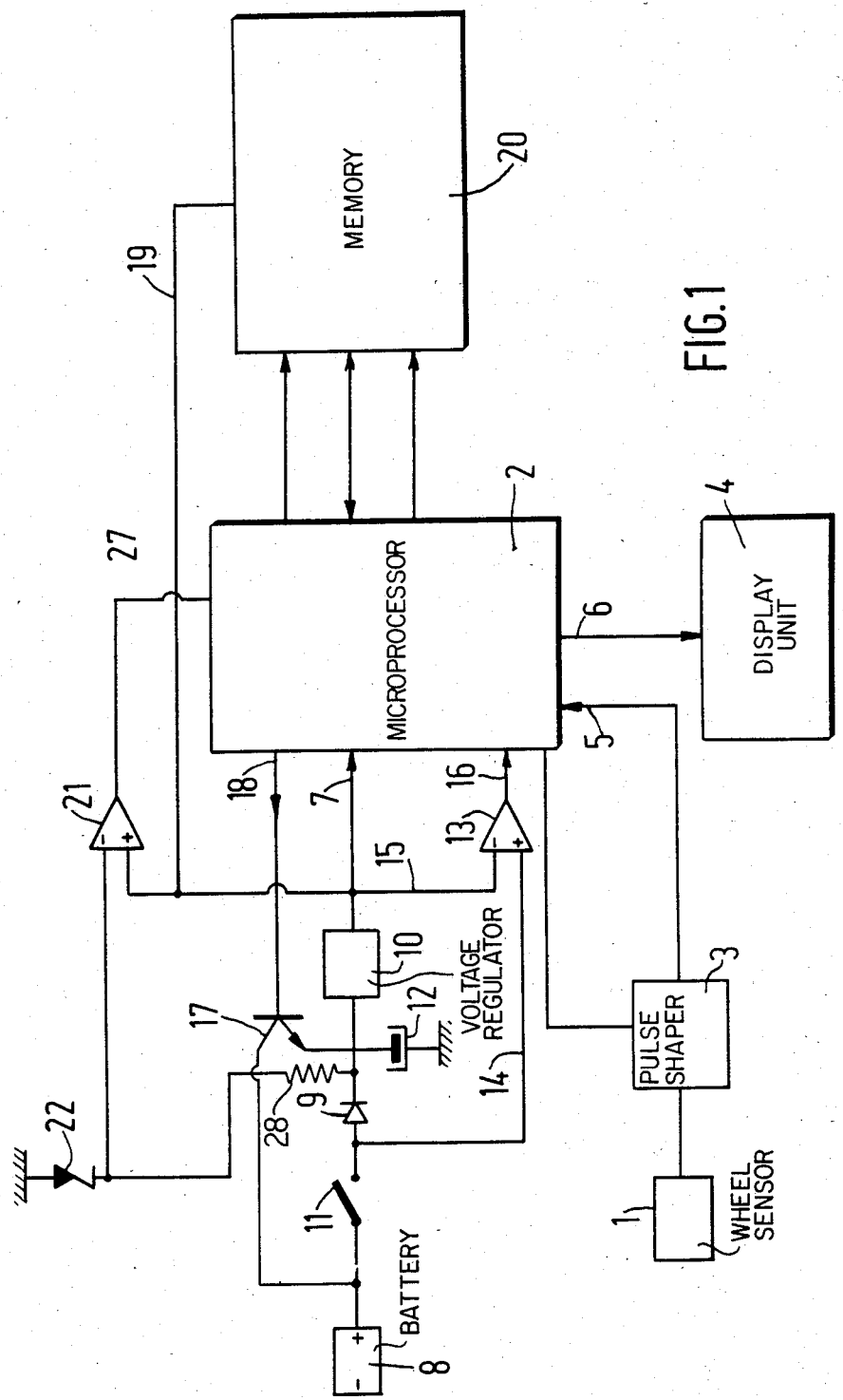
FIG. 1 is a block diagram of the totalizer of the invention.

In the example shown, where the counter is a micro processor, a wheel sensor 1 feeds mileage distance pulses to this micro processor 2 at input 5 through an interface 3 which shapes these pulses. The micro processor 2 counts them, translates them, feeds them through output 6 to a display unit 4 which displays, on the one hand, the total distance covered since the vehicle was put on the road, and, on the other hand, the partial distance travelled since the last reset. Microprocessor 2 is fed with a five volt supply by battery 8 at input 7 with interposition of a diode 9 and a voltage regulator 10. Switch off is provided by switch 11. A high capacity capacitor 12, for example of at least a 100 $\mu$F is connected in front of the regulator 10. A comparator 13 receives on line 14 the voltage of battery 8 through switch 11 and, on line 15, the output voltage of regulator 10. A transistor 17 connected directly to the positive pole of the battery, on the one hand, and on the other to the regulator 10 and to capacitor 12 is controlled via line 18 by the microprocessor 2.

A second comparator 21 having an output connected to microprocessor 2 by line 27 has inputs connected on the one hand to the output of the regulator 10 and on the other to the cathode of a Zener diode 22, the anode of which is connected to ground. The cathode of the Zener diode 22 is fed by the condensor 12 through a resistor 28.

The distance information received by microprocessor 2 is safeguarded, at each ignition switch off, in a non volatile memory 20 supplied in electric power by line 19.

The operation of the unit which has just been described is as follows:

When, following ignition switch off by opening of switch 11, the supply voltage of the equipment remains at a sufficient value, for a certain time, because of the energy stored in capacitor 12, comparator 13 informs micro processor 2 over line 16 that the ignition has been switched off, by comparison of the information on lines 14 and 15. On the one hand, the information received by micro processor 2 on line 16 indicates that the distances should be transferred into the non volatile memory and on the other hand this information on line 16 indicates to micro processor 2 that transistor 17 should be controlled over line 18 so as to supply capacitor 12 and thus regulator 10 directly with power.

When the transfer is finished, the microprocessor 2 controls the transistor 17 in order to make it nonconductive and capacitor 12 is freely discharged in the regulator.

The second comparator 21 compares the voltage from regulator 10 with a reference voltage, obtained by the Zener diode 22 for example 4.5 volts and as soon as the output voltage of the regulator drops below 4.5 volts, comparator 21 compels micro processor 2, over line 27, to keep its outputs at zero.

The nonvolatile memory is here formed, as shown in FIGS. 2a and 2b, of sixty-four registers with four cells, i.e. a total of 256 cells, or bits of information, in which the number of writing cycles per cell is 1000 at most. There has been shown by way of example writing in the first eight registers of the memory data corresponding to a distance of 100 123.6 kilometer. The end of the contents is indicated by a 4 bits digit of code 1111 (i.e. F in hexadecimal notation).

According to the invention, the memory is divided into two zones, a "journey" zone of 56 registers (0 to 37 H) and a "fixed" zone of 8 registers (38 H to 3F H).

Let us suppose that the total distance $D_T$ travelled from the time the vehicle was put on the road, is 200 000 kilometers at most, and may reach 199 999.9 km. It will be formed then of seven digits $D_{T7}$, $D_{T6}$, $D_{T5}$, $D_{T4}$, $D_{T3}$, $D_{T2}$, $D_{T1}$.

Let us suppose that the partial distance $D_P$, which may be reset at any time by a key, is 1000 km at most, i.e. reaches at most 999.9 km, it is therefore formed of four digits $D_{P4}$, $D_{P3}$, $D_{P2}$, $D_{P1}$.

The intermediate total distance $D_I = D_T - D_P$ is formed by seven digits, $D_{I7}$, $D_{I6}$, $D_{I5}$, $D_{I4}$, $D_{I3}$, $D_{I2}$, $D_{I1}$.

As is shown in FIG. 3, by way of example, the three most significant digits $D_{I7}$, $D_{I6}$, $D_{I5}$ of the intermediate total distance are written into the "fixed" part of the memory (bottom right) and the four least significant digits of this distance $D_{I4}$, $D_{I3}$, $D_{I2}$, $D_{I1}$ in the first line of the "journey" part. They are followed by a code or recognition word F. This word is itself followed by different successive partial distances $D'_P$, $D''_P$, $D'''_P$ ... each followed by a recognition word E defining the end of writing of each partial distance $D'_P$, $D''_P$, $D'''_P$ ....

The total distance is calculated by the micro processor by adding all the partial distances written into the journey zone plus the intermediate total distance $D_I$. The end of the zone of addition of these partial distances is indicated by the recognition word D.

It is clear from the foregoing that the "compression" process of the invention appreciably increases the life span of the memory. In a memory with 64 registers, the fact of writing successive total distances of eight digits in successive registers, instead of always writing in the same registers would already have multiplied the life span of the memory by eight. But the invention further improves this compression rate, by writing only in the "journey" part partial distances having on average three to four digits, which leads to a compression rate of 56/4≈14, for a memory with 64 registers 8 of which are reserved for writing the intermediate total distance.

It can be seen that the "compression" procedure increases the life span of a non volatile memory by a factor $$n = \frac{N}{I+2}$$

because of the "journey" zone with
N=capacity of the "journey" zone,
I=capacity required for one intermediate partial distance data,
the term I+2 taking into account the recognition digits E and D.

What is claimed is:

1. A motor vehicle mileage totalizer, comprising:
   a wheel sensor means for providing mileage distance data;
   a nonvolatile memory;
   a microprocessor, responsive to said mileage distance data and said nonvolatile memory, for calculating total distance $D_T$ and partial distance $D_P$ traveled and providing $D_T$ and $D_P$ data;
   means for supplying electric power to said microprocessor;
   switch means for turning on and turning off power to said microprocessor;
   display means, responsive to said microprocessor, for displaying at least one of total distance $D_T$ and partial distance $D_P$; and
   means, responsive to said switch means for transferring successive partial distance data $D'_P$, $D''_P$, $D'''_P$..., to said nonvolatile memory, each successive time said switch means turns off power to said microprocessor, each of said successive partial distance data being located in adjacent memory cells of said memory, said means for transferring being further responsive to said switch means in the on condition, for transferring data from said memory to said microprocessor, said microprocessor further including means for summing all successive partial distance data $D'_P$, $D''_P$, $D'''_P$... contained in said nonvolatile memory with an intermediate total distance data $D_I$ and providing a new intermediate total distance data for recording in said memory.

2. The mileage totalizer as claimed in claim 1, wherein, between said microprocessor and said switch means, there are mounted a first voltage comparator and a capacitor comprising an energy reservoir providing an output to a voltage regulator, said voltage regulator having an output connected to an input of said comparator and said capacitor connected to another input of said comparator so that each voltage drop is made known to said first comparator which informs said microprocessor thereof, the energy stored in said capacitor maintaining the voltage at a sufficient value for a certain time so as to allow transfer of the information from said microprocessor into said memory.

3. The totalizer as claimed in claim 2, further comprising a second switching means, controlled by said microprocessor, for supplying the capacitor and the regulator directly with electric power from said means for supplying.

4. The totalizer as claimed in claim 2, further comprising a second comparator for comparing the voltage from said regulator with a reference voltage and, should the voltage drop below said reference voltage, for compelling said microprocessor to keep a given state at its outputs.

* * * * *